United States Patent [19]

Limberg

[11] 3,787,629

[45] Jan. 22, 1974

[54] APPARATUS FOR DISTINGUISHING BETWEEN VARIOUS FM BROADCAST MULTIPLEX TRANSMISSIONS

[75] Inventor: Allen Le Roy Limberg, Lambertville, N.J.

[73] Assignee: RCA Corporation, New York, N.Y.

[22] Filed: May 9, 1972

[21] Appl. No.: 251,771

[52] U.S. Cl. ........................................ 179/15 BT
[51] Int. Cl. ........................................ H04h 5/00
[58] Field of Search ...... 325/48, 49, 64; 179/15 BT, 179/1 GQ, 100.4 ST, 100.1 TD

[56] References Cited

UNITED STATES PATENTS 3,708,623 1/1973 Dorren ........................ 179/15 BT
3,679,832 7/1972 Halpern ........................ 179/15 BT
1,941,067 12/1933 Armstrong ........................ 325/48

FOREIGN PATENTS OR APPLICATIONS 1,059,007 2/1967 Great Britain ................ 179/15 BT

OTHER PUBLICATIONS

Quadrasonics On–The–Air Feldman Audio Jan. 1970
Quart Broadcasting System Gerzon Audio Sept. 1970

*Primary Examiner*—Kathleen H. Claffy
*Assistant Examiner*—Thomas D'Amico
*Attorney, Agent, or Firm*—Eugene M. Whitacre, Kenneth R. Schaefer

[57] ABSTRACT

A 38kHz flag subcarrier accompanying an FM multiplex transmission identifies whether such multiplex transmission includes two channel or surround stereophonic information. Apparatus to provide such a flag subcarrier comprises, for example, a source of direct potential to unbalance a then unused balanced quadrature subchannel modulator within the transmitter during two channel transmission. Receiver apparatus to detect the transmission of such a flag subcarrier comprises a threshold detector coupled by a subsonic low pass filter to the corresponding synchronous subchannel detector. Indicating and/or automatic switching apparatus responsive to the detector output is provided.

6 Claims, 3 Drawing Figures

Fig. 2

Figure 1:
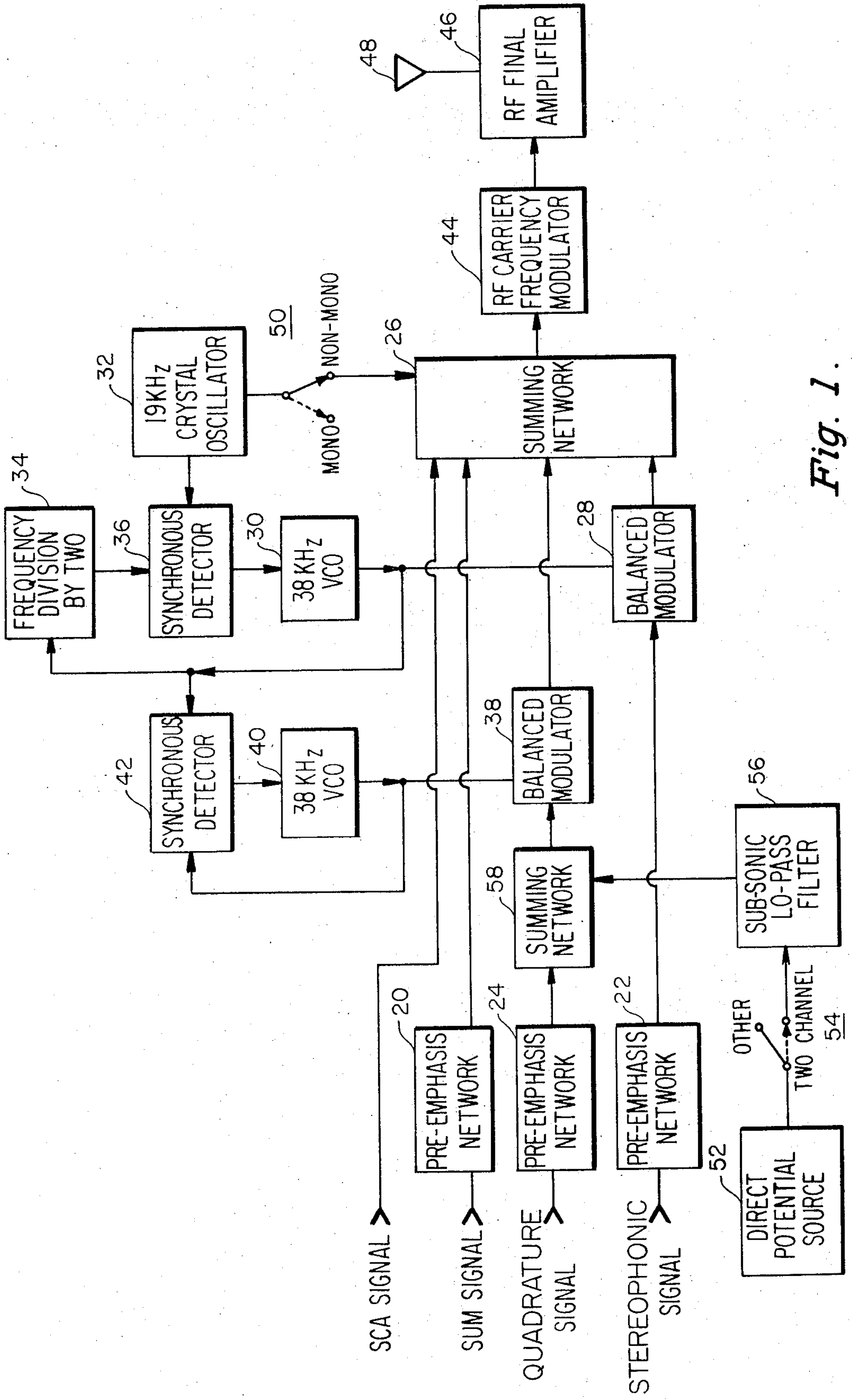

APPARATUS FOR DISTINGUISHING BETWEEN VARIOUS FM BROADCAST MULTIPLEX TRANSMISSIONS

The present invention is concerned with FM broadcast radio multiplex transmission and reception and, in particular, with apparatus for distinguishing whether two channel stereophonic information or stereophonic information including more than two channels is being broadcast.

In conventional two channel stereophonic FM broadcasting, a multiplex signal termed a composite stereophonic signal is transmitted which comprises the additive combination of a main or sum signal including left plus right (L+R) loudspeaker signals in a frequency range extending from 50 to 1,500Hz, a pilot signal at a frequency of 19kHz, a stereophonic difference signal including left minus right (L–R) information impressed as double AM sidebands on a suppressed 38kHz stereophonic subcarrier, the latter subcarrier being in predetermined time relation with the pilot subcarrier and the sidebands extending over a frequency range of 23kHz to 53kHz. The multiplex signal may also include, besides the composite stereophonic signal components, an SCA subchannel in which a frequency modulated subcarrier (usually at 67kHz) is provided to transmit privileged information.

Several systems have been proposed for transmitting additional information (e.g., "rear" sound signals) along with the above-described conventional stereophonic signals. Such systems will hereinafter be referred to as "surround stereophonic" systems to conveniently distinguish from conventional two channel or "up-front" stereophonic transmission and reception systems.

In order to carry the additional information, some of these later systems utilize additional subchannels. For example, one proposal involves a quadrature subchannel having double AM sidebands impressed on a suppressed 38kHz subcarrier in quadrature (90°) phasing with the stereophonic subcarrier. Additional subchannels, including information modulated on 57kHz or 76kHz subcarriers have also been proposed.

In the conventional two channel stereophonic broadcast system, the 19kHz pilot signal is used as a "flag" to distinguish transmission of stereophonic information from the transmission of monophonic or only main channel information. The 19kHz pilot signal is not only a flag for two channel stereophonic transmission but serves in the receiver as a timing reference for regenerating the suppressed 38kHz subcarrier so as to permit demodulation of the (L–R) difference signal information. The 19kHz pilot signal and an L–R difference signal subchannel preferably are retained when surround stereophonic signals are transmitted so as not to interfere with the reception, by stereophonic receivers already in the field, of two channel information contained in these signals.

In a receiver designed to reproduce surround stereophonic sound information, it is desirable to ascertain whether a transmission is of the conventional two channel type or of the surround stereophonic type for the following reasons. First, the matrixing of the main channel and subchannel signals should be changed to accommodate differences in the "aural perspective" afforded by two channel and surround stereophonic reproductions. Second, detectors associated with unused subchannels preferably should be disabled or decoupled from loudspeakers to obviate noise contributions of such subchannels and to improve dynamic range for weak signal reception of two channel stereophonic transmissions. Furthermore, the listener may wish to be informed of the nature of the transmission to aid him in program selection. To distinguish between two channel and surround stereophonic transmission it has been suggested that a flag signal accompany one of these two types of transmission.

One suggestion has been to include a continuous wave 57kHz flag signal in third harmonic relationship with the 19kHz pilot signal, the 57kHz wave crossing the average value axis coincidentally with, and in the same direction as, the 19kHz pilot signal. One undesirable effect of using such a 57kHz flag signal is that it is separated by an audible (10kHz) heterodyne or frequency difference from the 67kHz SCA subcarrier when the latter is broadcast. Also, an additional detector would be required in the receiver to detect the presence of a 57kHz flag.

In a system for transmitting surround stereophonic sound information signals by means of at least two AM suppressed subcarrier waves and an audio frequency sum signal, the transmitter equipment includes a balanced, amplitude modulator for each subcarrier wave. For monophonic transmissions, neither of the balanced modulators ar energized. For two channel stereophonic transmissions, one of the balanced modulators is excited by the conventional difference signal (L–R) while the other (the quadrature modulator) is not required for audio information transmission. In the case of surround stereophonic signal transmission, each of the balanced modulators is excited, one by the (L–R) difference information and the other, for example, by the difference between front and back (F–B) information. Similarly, in a receiver, one or more detectors required for surround stereophonic reproduction are unused during two channel stereophonic transmissions.

In accordance with one aspect of the present invention, a system for generation and detection of a flag to indicate whether two channel or surround stereophonic sound is being transmitted is arranged to utilize available but unused apparatus in each of the transmitter and receiver.

In a preferred embodiment, at least one of the balanced modulators (e.g., the quadrature modulator) at the transmitter is unbalanced during two channel transmissions by applying a direct potential to such modulator. The resulting quadrature phased, fixed frequency signal is representative of two channel rather than surround stereophonic transmissions. The conventional 19kHz pilot signal distinguishes the two channel from monophonic transmission.

Alternatively, an appropriately phased tone generator operating at the fixed frequency may provide the flag, for example, where the transmitter is not equipped for transmission of the second subchannel (e.g., a conventional two channel transmitter). The admixture of 38kHz quadrature subcarrier with the two-channel composite stereophonic signal produces no direct signal in the stereophonic subchannel demodulators of receivers employing a synchronous detector for (L–R) detection, as is the case for most current receivers.

However, in a surround stereophonic signal receiver, a direct signal will be produced in the quadrature subchannel detector during two-channel stereophonic broadcasting. The absence or presence of this direct signal may then be detected to determine which type of stereophonic transmission — two-channel or surround — is being received. Such determination permits appropriate indicator means to be activated and the detected multiplex signals to be appropriately matrixed for application to loudspeakers.

Figure 2:
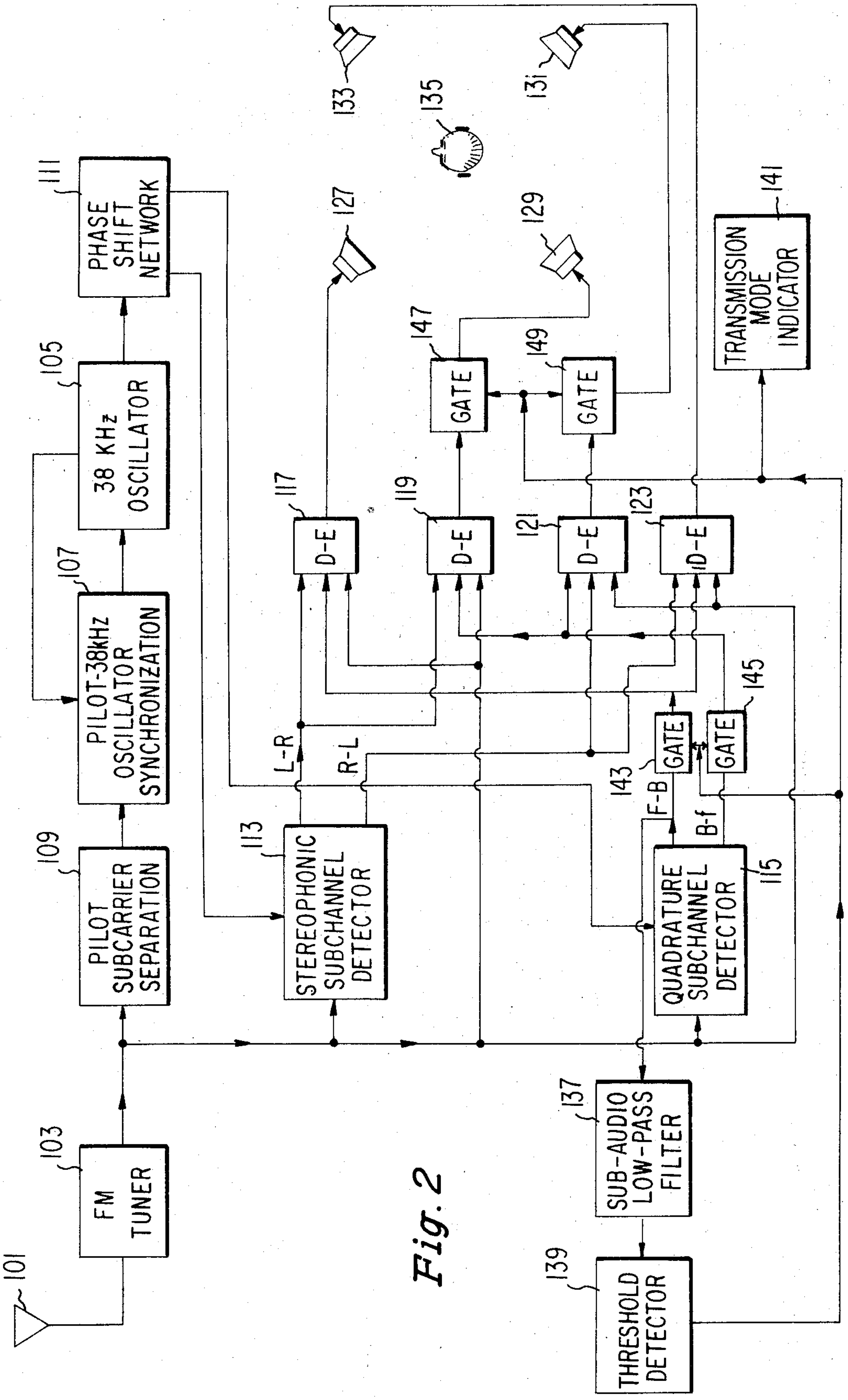
Figure 3:
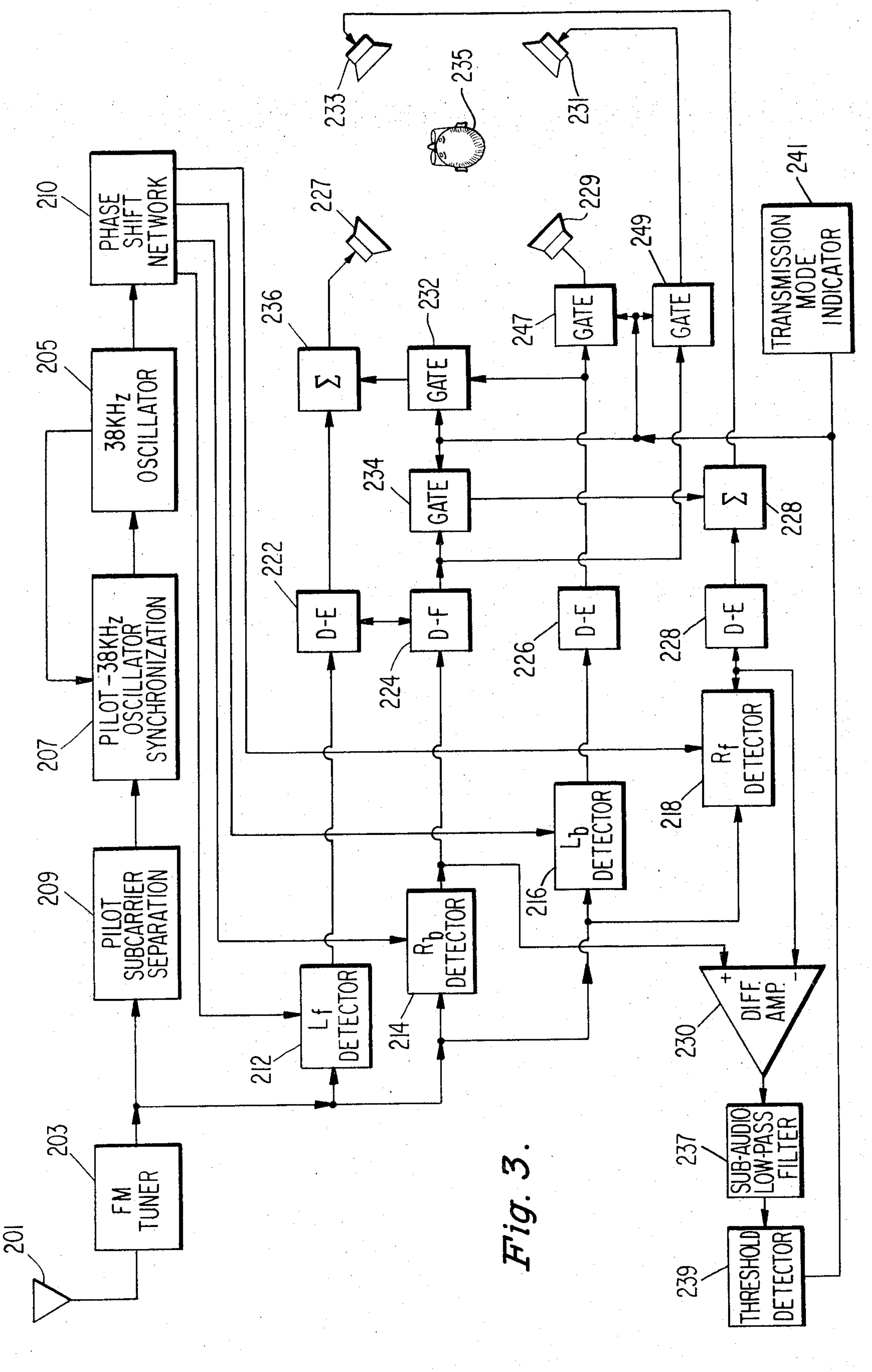

The various aspects of the present invention will be better understood by reference to the following description in connection with the accompanying drawing in which:

FIG. 1 illustrates, in block diagram form, a portion of a frequency modulation (FM) transmitter for broadcast of monophonic, two channel stereophonic or surround stereophonic sound information;

FIG. 2 illustrates, in block diagram form, a surround-stereophonic FM receiver employing two separate subchannel detectors also being arranged for detection of information representative of presence or absence of surround-stereophonic information in the received signal; and FIG. 3 illustrates, in block diagram form, a surround-stereophonic FM receiver employing time-division multiplex demodulation and including apparatus for detecting presence or absence of surround-stereophonic information in the received signal.

In the transmitter of FIG. 1, three audio frequency signals, designated sum, quadrature and stereophonic signals, are coupled to respective pre-emphasis networks 20, 22 and 24. The pre-emphasized sum signal (e.g., the sum of front, back, left and right audio signals) is coupled to one input of a summing network 26. The pre-emphasized stereophonic signal (e.g., the difference between left and right audio signals) is coupled to one input of a first balanced modulator 28. A second input is supplied to modulator 28 by a conventional synchronized oscillator such as the illustrated 38kHz VCO (voltage controlled oscillator) 30 which is arranged to provide a continuous subcarrier wave at 38kHz. Oscillator 30 is locked in phase and frequency with respect to a continuous wave 19kHz pilot tone provided by a crystal oscillator 32. To this end, the output of 19kHz oscillator 32 is coupled to a first input of a synchronous phase detector 36 while the output of 38kHz oscillator 30 is coupled via a frequency divider stage 34 to a second input of phase detector 36. Detector 36 produces output signals representative of phase errors between oscillator 32 and the divided output of 38kHz oscillator 30 so as to correct the operating phase of oscillator 30 in a well-known manner. Balanced modulator 28, in response to the applied 38kHz subcarrier and the stereophonic difference signal, couples a double sideband amplitude modulated (AM) suppressed subcarrier signal to summing network 26.

In a similar manner, the pre-emphasized quadrature signal components (e.g., the difference between front and back audio signals) are applied to a second balanced modulator 38. A second 38KHz subcarrier wave in quadrature (90°) phase relationship to the output of oscillator 30 is coupled to modulator 38. The quadrature 38KHz wave is provided, for example, by means of a second 38KHz voltage controlled oscillator 40 which is locked in phase with respect to oscillator 30 by means of a second synchronous phase detector 42.

Balanced modulator 38, in response to the applied quadrature 38KHz subcarrier and the "surround" stereophonic difference signal, couples a double sideband amplitude modulated (AM) suppressed subcarrier signal to network 26. The 19KHz pilot signal output of oscillator 32 is also coupled to summing network 26 by means of a switch 50 shown in the closed (NON-MONO) position.

If desired, SCA signals (privileged communication signals) also may be applied to summing network 26. The resultant composite signal output of network 26 is processed in a conventional manner for application to a frequency modulator 44, power amplifier 46 and antenna 48 for transmission.

In accordance with one aspect of the present invention, means are provided for unbalancing quadrature modulator 38 during conventional two-channel stereophonic transmission (i.e., when quadrature stereophonic signals are absent). The unbalancing means comprises a source of direct potential 52 which is coupled via a switching means 54, a subsonic (low-pass) filter 56 and a summing network 58 to quadrature modulator 38.

Switching means 54 is maintained in the open position during either surround stereophonic or monophonic signal transmission so that direct potential source 52 has no effect on the operation of modulator 38. However, when two channel stereophonic information is broadcast, switching means 54 is closed, thereby providing a direct potential to modulator 38 to cause it to operate in an unbalanced manner. That is, a 38KHz subcarrier component will be present at the output of modulator 38. The quadrature signal input to modulator 38 will be zero under two channel transmission conditions so that an unmodulated 38KHz flag subcarrier will be included in the composite signal output of network 26. The simultaneous presence of 19KHz pilot and unmodulated 38KHz quadrature subcarrier signals is then indicative of two channel stereophonic transmission. The simultaneous absence of the 38KHz flag and presence of 19KHz pilot is indicative of surround stereophonic transmission and the absence of both 19KHz pilot and 38KHz flag is indicative of monophonic transmission.

Referring to the receiver shown in FIG. 2, FM broadcast signals are intercepted by an antenna 101 and are applied to an FM tuner 103 comprising an R–F amplifier, a local oscillator, a mixer, I–F amplifiers and limiters and an FM detector arranged for producing at the output of the detector a composite signal which is a replica of the signal modulating the received FM R–F carrier. The composite signal output of the detector portion of tuner 103 comprises a sum component extending over the audio frequency range (e.g. 50Hz to 15,000Hz), a continuous wave pilot component at a nominal frequency of 19kHz, a stereophonic difference signal component impressed as a first pair of AM sidebands on a first suppressed 38kHz subcarrier, the sidebands extending between 23kHz and 53kHz, and a quadrature difference signal component impressed as a second pair of AM sidebands on a second suppressed 38kHz subcarrier in quadrature relationship with the first subcarrier. Typically, the first pair of sidebands are representative of the difference between left and right (L—R) audio signals while the second (quadrature) pair of sidebands are representative of the difference between front and back (F—B) audio signals, the directions being specified with reference to a listener's position. As in a conventional stereophonic FM receiver, means, illustrated as a 38kHz oscillator 105, are provided for regenerating a 38kHz subcarrier in the receiver. The oscillator 105 is synchronized in frequency and phase by synchronization circuitry 107 responsive to the nominal 38kHz signal from the oscillator 105 and to a pilot signal component coupled from the FM tuner 103 by pilot signal separation circuitry 109. While oscillator 105 and associated automatic frequency and phase control apparatus are shown in FIG. 1 as the means for supplying a 38kHz subcarrier, frequency doubling or injection-locked oscillator arrangements, as are also known in the prior art, may alternatively be used without derogation of the present invention. An oscillator operating at a harmonic of 38kHz and associated frequency dividers alternatively may be used.

The synchronized 38kHz subcarrier is applied to a phase-shift network 111 to produce 38kHz stereophonic and quadrature subcarriers, which subcarriers are in fixed quadrature (90°) phase relationship to each other. The stereophonic subcarrier, as in a conventional two channel FM receiver, is the second harmonic of the 19kHz pilot signal component of the detected composite signal and crosses an average value axis coincidentally with the pilot signal component. The stereophonic subcarrier is applied together with the detected composite signal to a stereophonic subchannel detector 113 which demodulates L—R (and R—L) information in the detected composite signal.

Similarly, quadrature 38kHz subcarrier from the phase-shift network 111 is applied together with the detected composite signal to a quadrature subchannel detector 115 which demodulates the information contained in that subchannel of the detected composite signal. During surround stereophonic broadcast transmissions, the demodulated information may, for example, be front minus back (F—B) information and antiphase B—F information. The F—B and B—F information from detector 115, the L+R+F+B information contained in the 50–15,000Hz portion of the detected composite signal and the L—R and R—L information provided by the detector 113 are additively matrixed together in various combinations at the inputs of deemphasis amplifiers 117, 119, 121, 123. Deemphasized and amplified audio signals are then supplied to respective loudspeakers 127, 129, 131 and 133 surrounding a listener 135.

In accordance with the present invention, during two-channel broadcast conditions, the unmodulated quadrature 38kHz subcarrier is present in the received signals. A direct signal component therefore is detected and is provided from the output circuit of the quadrature subchannel detector 115. This direct signal (e.g. voltage) component is separated from the ultrasonic remnants of the detection process in a subaudio lowpass filter 137 which passes only subsonic frequencies (e.g., below 20Hz). The output of filter 137 is supplied to a threshold detector 139 which senses the absence or presence of the direct signal component and provides electrical indications thereof. These electrical indications are converted to audible or visible indications (or both if desired) by an appropriate transmission mode indicator 141. For example, indicator 141 may be a light of the type frequently used for indications of two channel reception in conventional two channel stereophonic receivers.

When the threshold detector 139 indicates the presence of a direct signal component accompanying a two-channel stereophonic FM broadcast, gates 143 and 145 decouple the outputs of quadrature subchannel detector 115 from the input circuits of the de-emphasis and matrixing amplifiers 117, 119, 121, 123, so the detected noise from the vacant subchannel is not included in the signals coupled to the loudspeakers 127, 129, 131, 133. This improves the signal-to-noise ratio of these signals during two-channel stereophonic reproduction.

During two channel reproduction, additional gates 147 and 149 may be included, if desired, to decouple the signals normally provided by the de-emphasis amplifiers 119, 121 to the loudspeakers 129, 131, respectively. In that case, gate 147 prevents L signals from being reproduced by left-rear loudspeaker 129 and such signals (L) are reproduced only by left-front loudspeaker 127. If gate 147 is omitted during two channel reception, the two-channel left (L) signal will appear in each of speakers 127 and 129, causing the sound source to appear from the listener's left rather than the left-front quadrant, as is customary in two channel reproduction. Gate 149 is arranged to provide a similar function with respect to the two channel reproduction of right (R) signals. This switching preserves proper sound perspective despite the number of subchannels in the stereophonic broadcast, two-channel stereophonic L and R signals being designed to reproduce sound sources spaced ±45° apart at extremes of the front quadrant, rather than in the 180° spatial relationship of the L and R signals in surround stereophonic transmissions.

Referring now to FIG. 3, which shows a time-division multiplex type of FM radio receiver, the antenna 201, FM tuner 203, 38kHz oscillator 205, pilot and 38kHz oscillator synchronization circuitry 207, and pilot subcarrier separation circuitry 209 correspond to elements 101, 103, 105, 107, 109 in the radio receiver diagrammed in FIG. 2. The phase shift network 210 provides 38kHz subcarrier in +45°, −135°, +135° and −45° phases with respect to the stereophonic subchannel, which phases of subcarrier are respectively applied to left-front signal detector 212, right-rear signal detector 214, left-rear signal detector 216 and right-front signal detector 218, respectively. Each of these detectors 212, 214, 216, 218 samples the composite stereophonic signal supplied to it from the FM tuner 103. The resultant decoded left-front ($L_f$), right-rear ($R_b$), left-rear ($L_b$) and right-front ($R_f$) signals from the detectors 212, 214, 216, 218, respectively are coupled to de-emphasis and power amplifiers 222, 224, 226, 228, respectively, and thence to loudspeakers 227, 231, 229 and 233, respectively. The de-emphasis amplifiers 222, 224 may be interconnected to provide greater differential mode again than common mode gain for $L_f$ and $R_b$ signals applied thereto to compensate for detection efficiency differences between main channel and subchannel sampling when wide-angle (e.g., 180°) sampling is used. The de-emphasis amplifiers 226, 228 may be similarly interconnected to provide greater differential mode than common mode gain for $L_b$ and $R_f$ signals applied thereto to compensate for detection efficiency differences between main channel and subchannel sampling.

When two-channel stereophonic signals are received, the accompanying quadrature subcarrier transmission flag will produce a direct component evidenced as a shift between the recovered direct signal in the left-front and right-front detectors 212, 218 as compared to the left-rear and right-rear detectors 214, 216. This shift will be evidenced as a direct voltage in the output circuit of a differential amplifier 230 having its inverting and non-inverting input circuits separately and respectively connected to one of the front detectors (212 or 218) and one of the rear detectors (214 or 216). The output signal from the differential amplifier 230 is filtered in a sub-audio low-pass filter 237 and applied to a threshold detector 239, which senses the absence or presence of the direct voltage (or current) and provides electrical indications thereof.

These electrical indications are translated into visual or aural indications by transmission mode indicator circuitry 241 and may be used to de-couple signals from the rear loudspeakers 229, 231 during two-channel stereophonic reception by means of gates 232 and 234. Gates 232 and 234 are rendered transmissive during two-channel stereophonic signal reception to add signal originating from the left-rear detector to that originating from the left-front detector in an additive matrix 236 and to add signal originating from the right-rear detector to that originating from the right-front detector in an additive matrix 238. The signals add constructively while the noise contribution of the quadrature subchannel being anti-phase in the added signals is cancelled. An improvement in two-channel stereophonic signal reproduction is thus obtained.

Certain variations of the basic schemes shown in FIGS. 1 and 2 are contemplated in the present invention. Gating to decouple loudspeakers from the quadrature subchannel information or to decouple them from application of signal can be effectuated prior to de-emphasis as well as thereafter. The use of a differential amplifier to eliminate common-mode direct bias in multiplex detector outputs prior to subsonic filtering and threshold detection to sense presence or absence of 38kHz flag subcarrier can be applied to a matrix receiver of the type shown in FIG. 1. (The differential amplifier inverting and non-inverting inputs would be connected to receive F—B and B—F inputs from the quadrature subchannel detector 115.) Also the direct signal component in the output of any one of the time division multiplex detectors 212, 214, 216, 218 of FIG. 2 could be determined directly without use of a differential amplifier 230 to suppress common mode detector bias potential, as per FIG. 1.

What is claimed is:

1. In an FM radio receiver, apparatus for distinguishing between reception of two channel and surround stereophonic sound information comprising:

means for providing a composite signal including, during two channel stereophonic reception, an audio sum signal component, a continuous wave pilot signal component at a predetermined frequency, a stereophonic audio difference signal component impressed as a first pair of amplitude modulation sidebands on a first suppressed subcarrier, the subcarrier being at the second harmonic frequency of said pilot signal and in predetermined time relationship therewith, and an unmodulated subcarrier at a frequency equal to said suppressed subcarrier and in quadrature phase relationship therewith, said composite signal further including, during surround stereophonic reception, a surround stereophonic audio difference signal component impressed as a second pair of amplitude modulation sidebands on a second suppressed subcarrier, the second subcarrier being at the same frequency and phase as said unmodulated subcarrier and being substituted for said unmodulated subcarrier, synchronous detection means, coupled to said composite signal providing means, responsive during two channel reception to said unmodulated subcarrier and responsive during surround stereophonic reception to said sidebands associated with said second suppressed subcarrier for providing, respectively, output signals including an indication of two channel reception and output signals including said surround stereophonic audio difference signal component, sub-audio bandpass filter means coupled to said synchronous detection means for separating said indication of two channel reception from said output signals, and means coupled to said filter and responsive to said separated indications for producing an output signal during reception of two channel information.

2. In an FM broadcast system, apparatus for providing information to distinguish between transmission of two channel and surround stereophonic sound signals comprising:

means for providing, during two channel stereophonic transmission, a composite signal including an audio sum signal component, a continuous wave pilot signal component at a predetermined frequency, a stereophonic audio difference signal component impressed as a first pair of amplitude modulation sidebands on a first suppressed subcarrier, the subcarrier being at the second harmonic frequency of said pilot signal and in predetermined time relationship therewith, and an unmodulated subcarrier at a frequency equal to said suppressed subcarrier but in quadrature phase relationship therewith, and means for substituting for said unmodulated subcarrier, during surround stereophonic transmission, an additional composite signal component including surround stereophonic audio difference signals impressed as a second pair of amplitude modulation sidebands on a second suppressed subcarrier, the second subcarrier being at the same frequency and relative phase with respect to said first subcarrier as said unmodulated subcarrier.

3. In an FM broadcast system apparatus for providing transmission-mode distinguishing information as claimed in claim 2 including a balanced modulator having a first input circuit for application of subcarrier, having a second input circuit for application of modulating signal and having an output circuit to provide at least a portion of said second pair of amplitude modulation sidebands;

a source of direct signal and switching means to couple said source of direct signal to said second input circuit of said balanced modulator during the transmission of two channel stereophonic sound signals.

4. In an FM broadcast system apparatus for providing transmission-mode distinguishing information as claimed in claim 3:

a subsonic filter coupling said switching means and said second input circuit of said balanced modulator.

5. In an FM receiver apparatus as defined in claim 1: amplifier means and gating means connected in cascade with said amplifier means after said synchronous detection means, said gating means being rendered transmissive in the absence of said indication of two channel reception.

6. In an FM receiver apparatus as defined in claim 1: synchronous detection means responsive to said first pair of amplitude modulation sidebands, gating means rendered non-transmissive in the absence of said indication of two channel reception, and combining means to combine signals coupled thereto from said synchronous detection means responsive to said first pair of amplitude modulation sidebands and signals coupled thereto via said gating means from said synchronous detection means responsive to said second pair of amplitude modulation sidebands.

* * * * *